Oct. 13, 1964     T. J. SCARNATO ETAL     3,152,432
ROTARY MOWER
Filed July 24, 1962
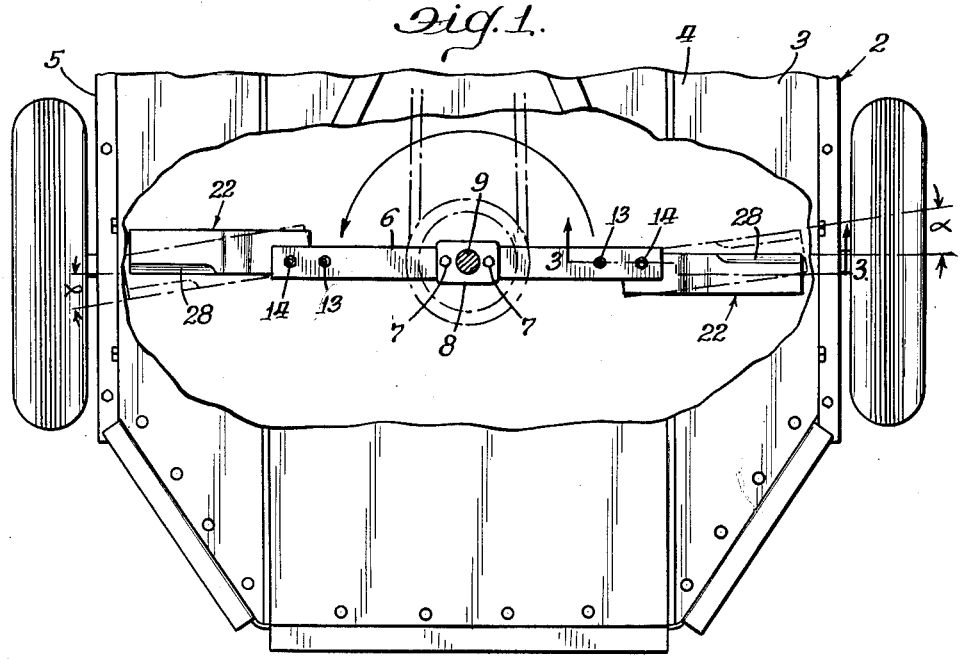
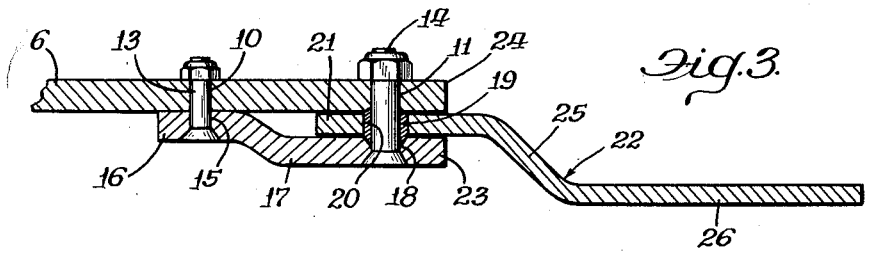
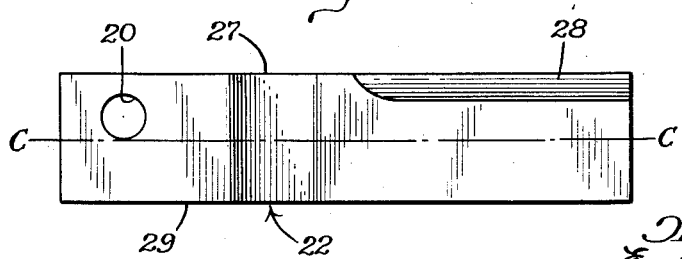
INVENTORS.
Thomas J. Scarnato
Eugen J. Birkenbach
Paul O. Pippel
Atty.

United States Patent Office 3,152,432
Patented Oct. 13, 1964

3,152,432
ROTARY MOWER
Thomas J. Scarnato and Eugen J. Birkenbach, Park Ridge, Ill., assignors to International Harvester Company, Chicago, Ill., a corporation of New Jersey
Filed July 24, 1962, Ser. No. 211,983
1 Claim. (Cl. 56—295)

This invention relates to rotary mowers and more specifically to a novel knife arrangement therefor.

In rotary mowers there is provided a vertical shaft to which is attached a rotating arm which may be in the form of a knife blade or the arm may carry a plurality of blades at its ends. In structures which provide a blade which also serves as an attachment to the center shaft or the power output shaft the cutting edge normally is radial with respect to the rotational axis and an optimum cutting position of the knife edge is conveniently presented to the material to be severed. The objection to this type of combined knife and mounting is that such blades are frequently subject to severe impacts by striking stones or other obstructions with sufficient severity to break the knife mounting and frequently the engine shaft. It is therefore preferred to attach a knife holder to the rotary shaft and to mount the blades or the knives at the ends of the holder so that the blades pivot about substantially vertical axis whereby upon striking the obstruction the knife is caused to fold back. In constructions heretofore available, it was proposed and held to be of advantage to have the blades extend out radially with the cutting edge of the blade substantially radially under no load conditions. We have discovered that with the current construction the blades or the swinging knives tend to fold back as they hit the crop or the material which is to be cut and that the cutting ability of the mower is materially reduced and the power consumption is materially increased in proportion to the amount that the knife lays back as it operates through the material.

It is a general object of the invention to construct a novel pivotal knife and so mount the same upon the mounting arms so that in the no-load position the knife has a lead ahead of the point of mounting.

More specifically, it is an object of the invention to construct a novel knife for mounting on the end of a rotary mounting arm in such manner that the axis of pivot is disposed ahead of the center of gravity of the knife so that upon rotation of the carrier with the knife, the knife is caused to lean forward of its mounting whereby upon the knife meeting the resistance of the load of the material to be cut, the knife will fold to a position substantially radial with respect to the axis of rotation of the assembly and thus present the cutting edge in optimum position for cutting the material.

A still further object of the invention is to provide a novel knife structure which is of simple and durable construction and which efficiently attains the foregoing objects.

These and other objects and advantages of the invention will become more readily apparent from the specification and the drawings wherein:

FIGURE 1 is a plan view of a rotary mower with a portion of the housing broken away and the mounting spindle shown in section;

FIGURE 2 is an enlarged plan view of one of the knives, and

FIGURE 3 is an enlarged sectional view taken substantially on the line 3—3 of FIGURE 1.

Having particular reference to the drawings, there is shown a mower designated 2 including a housing 3 having a top wall 4 and peripheral depending walls 5 which provide an enclosure for the knife carrier 6 which comprises a bar fastened by means of the bolts 7 substantially medially thereof to a mounting pad 8 which is suitably fastened to the vertical rotating spindle or shaft 9, said spindle 9 being suitably mounted from the top wall 4 of the housing 3 as is well known to those skilled in the art. Thus it will be realized that the carrier or knife mounting arm 6 rotates horizontally on a substantially vertical axis. Each end of the carrier 6 is provided with a pair of apertures 10, 11 to which are admitted the bolts 13 and 14, the bolt 13 being extended through an aperture 15 in the offset inner end 16 of a knife holder or clamp 17. The bolt 13 is headed at its lower end and is provided with a nut at its upper end suitably drawing the parts together. The bolt 14 goes along with bolt 13 and passes through the apertures 18 and 11 and through a bearing 19 about which at the opening 20 in the upwardly offset inner end portion 21 of the novel knife blade generally designated 22 will pivot.

The blade 22 in addition to the horizontally disposed inner end portion 21, which is admitted between the outer end portion 23 of the knife holder 17 and the end portion 24 of the carrier 6 and projects outwardly, continues into a diagonal downwardly and outwardly extending intermediate portion 25 which in turn merges into a substantially horizontal outer end cutting portion 26.

As best seen in FIGURE 2, the leading edge 27 of the knife 22 is sharpened with a downward bevel along substantially the full length of the outer end portion 26 as seen at 28. The center of gravity of the blade 22 is substantially indicated by the line C—C of FIGURE 2 and it will be noted that the aperture 20 of the blade 22 is located between the line C—C and the leading edge 27 of the blade. The trailing edge 29 in this particular instance may be substantially flat.

In actual use we observed that the knife will be swung centrifugally outwardly, and in view of the mounting of the blade on an axis forwardly of the center of gravity, the blade will tend to assume a forwardly leading or advanced position by the angle α as shown in phantom lines in FIGURE 1. Thus, it will be noted that the edge 28 leads the balance of the knife. The weight of the knife is calculated in conjunction with the r.p.m.'s of the rotor such that under average loading conditions, that is, depending on the crop, etc. the blade will lean back so that the leading edge will meet the crop substantially normal to the load, the position of the edge being approximately radial with respect to the axis of rotation of the knife assembly.

What is claimed is:

A rotary mower comprising a driven hub, an elongated carrier mounted on the hub for rotation therewith about a substantially vertical axis and having a leading surface, blade members pivotally mounted to opposite ends of the carrier for swinging outwardly centrifugally, each blade member having a leading edge with a sharpened cutting section, each blade member having a pivotal mounting disposed between said leading edge and the longitudinal center line of the blade member whereby the blade members are caused to lean into the direction of rotation under no load conditions, each pivotal mounting comprising a pin extending through each blade, holders connected to said carrier and embracing respective blades therebetween and mounting the respective pin, and each blade having inner and outer end portions, said outer end portions offset below the inner end portion, each blade member being wider than the carrier and projecting in a trailing direction beyond the carrier and holder and having its leading edge disposed behind the leading surface of the carrier.

References Cited in the file of this patent
UNITED STATES PATENTS

| | | |
|---|---|---|
| 2,751,737 | Herod | June 26, 1956 |
| 2,786,322 | McEvers | Mar. 26, 1957 |
| 2,856,747 | Kolls | Oct. 21, 1958 |
| 2,924,058 | Brooks | Feb. 9, 1960 |